United States Patent [19]
Montgomery

[11] Patent Number: 5,182,760
[45] Date of Patent: Jan. 26, 1993

[54] DEMODULATION SYSTEM FOR PHASE SHIFT KEYED MODULATED DATA TRANSMISSION

[75] Inventor: Melvin G. Montgomery, Plano, Tex.

[73] Assignee: Atlantic Richfield Company, Los Angeles, Calif.

[21] Appl. No.: 633,977

[22] Filed: Dec. 26, 1990

[51] Int. Cl.⁵ .......................................... H04L 27/22
[52] U.S. Cl. ..................................... 375/52; 329/306; 375/81; 375/82
[58] Field of Search ............... 329/304, 305, 306, 307, 329/309, 323, 341; 367/48, 82; 340/870.18, 870.25; 375/52, 80, 81, 82, 83, 86

[56] References Cited

U.S. PATENT DOCUMENTS

| | | | |
|---|---|---|---|
| 3,265,813 | 8/1966 | McFarlane et al. | 329/304 |
| 3,835,404 | 9/1974 | Nakamura et al. | 375/80 |
| 4,166,979 | 9/1979 | Waggener | 375/120 |
| 4,215,427 | 7/1980 | Waggener et al. | 375/52 |
| 4,339,725 | 7/1982 | Ichiyoshi | 329/307 |
| 4,447,772 | 5/1984 | DeLong | 329/323 |
| 4,794,623 | 12/1988 | Levesque et al. | 375/86 |

OTHER PUBLICATIONS

Lancaster, "Hardware Hacker", *Radio-Electronics*, (Mar. 1990), pp. 58-61, 66-68 and 78.

Primary Examiner—Benedict V. Safourek
Attorney, Agent, or Firm—Vinson & Elkins

[57] ABSTRACT

A phase shift keyed telemetry system is disclosed, which is particularly adapted to demodulation of phase shift keyed signals where the medium of transmission is non-ideal, such that transitional cycles are present at each change of phase of the transmitted data. Demodulation is accomplished by comparison of the input signal to a reference signal generated from the input signal itself. The reference signal is generated by frequency dividing the input signal, preferably after full wave rectifying, by a multiple which is larger than the number of transitional cycles expected; the frequency divided signal is then multiplied in frequency to substantially match the frequency of the input signal. The use of the divider and multiplier removes the effects of transitional cycles of varying phase in generating the reference signal. A phase locked loop in the reference signal generating circuit also reduces the effects of frequency and phase shifting during the transitional cycles, as well as providing tolerance for missing cycles due to system noise.

20 Claims, 3 Drawing Sheets

DEMODULATION SYSTEM FOR PHASE SHIFT KEYED MODULATED DATA TRANSMISSION

This invention is in the field of data communication, and is particularly directed to phase shift keyed demodulation.

BACKGROUND OF THE INVENTION

Various types of modulated data transmission are well known. Examples of modulation techniques for the transmission of analog information include amplitude modulation and frequency modulation. Special modulation techniques are also well known for the transmission of digital data, including frequency shift keyed (FSK) modulation and phase shift keyed (PSK) modulation. As is well known in the art, in FSK modulation a number of cycles at a first frequency represents a "0" digital value, and a number of cycles at a second frequency represents a "1" digital value. PSK modulation uses the same carrier frequency for both a "0" value and "1" value, with different phase angles corresponding to the different digital values. A conventional phase difference between "0" and "1" states in PSK modulation is 180°.

In the petroleum industry, particularly in downhole operations such as drilling into the earth in the exploration and production of petroleum products, the communication of data concerning the operation is becoming increasingly important. Since modern drilling is necessarily done to greater depths (and at greater cost) in order to exploit less readily available reservoirs, the cost of drilling operations is increasing at a rapid rate. In order to ensure the highest degree of success in such operations, and to avoid potential problems during drilling, real-time knowledge of downhole conditions such as drilling parameters, bit location, bit direction, and information concerning the surrounding geology, is highly desirable.

My copending U.S. applications Ser. No. 554,022 now abandoned in favor of continuation application Ser. No. 746,309, filed Aug. 14, 1991, 554,030, both filed Jul. 16, 1990, assigned to Atlantic Richfield Company and incorporated herein by this reference, describe examples of transducers for communicating data from downhole to the surface by way of acoustic vibrations in the drill string, such communication commonly referred to as stress wave telemetry. As discussed therein, and as is true in other data communication environments, the transmission medium has a non-ideal frequency response to the signals being transmitted therethrough. In the case of data transmission by acoustic vibrations in the drill string (such transmission referred to as stress wave telemetry), significant stopbands exist at harmonic frequencies defined by the velocity of the particular vibrations in the drill string and the lengths of the drill string sections. As a result, FSK modulation of acoustic vibrations may have problems where one or both of the transmission frequencies are at or near a stopband for the drill string. Since the drill string characteristics can change as a result of the drilling operation (i.e., longer drill string sections, heavier pipe, heavier mud, etc.), assumptions that both FSK frequencies are in passbands for the drill string may not remain valid throughout the duration of the operation.

Another stress wave telemetry system is disclosed in copending U.S. Pat. application Ser. No. 183,231 filed Apr. 21, 1988, now U.S. Pat. No. 4,825,159, also assigned to Atlantic Richfield Company, and incorporated herein by this reference. This system uses equipment outside the periphery of the drill string, such as solenoids and eccentric motors, to similarly vibrate the drill string in a manner corresponding to the desired data.

PSK modulation would thus appear to be attractive in situations such as stress wave telemetry where non-ideal frequency response is presented by the communication medium. However, in the case of data transmission by acoustic vibrations through a drill string, the drill string tends to resist the phase changes necessary for communicating the information. A change in phase of the transmitted vibrations, indicating a change from one digital state to the other, will thus not appear instantaneously in the drill string. A series of transitional cycles are thus required in order for a change in phase (i.e., a change in data state transmitted) to take effect in this situation.

Conventional PSK demodulators are not capable of readily and accurately identifying phase changes which are not abrupt, for example which include a number of transitional cycles in making the phase change. It has been observed, however, from viewing oscilloscope and other representations of actual vibrations transmitted along a drill string, that PSK signals including such transitional cycles still contain the transmitted data.

In addition, noise and other spurious events during stress wave telemetry or other transmission can cause the loss of partial or full cycles of the PSK modulated data stream. When applied to conventional demodulators, such lost cycles and portions of cycles create significant error, due to loss of synchronization between the modulator reference signal and the input data signal.

It is therefore an object of this invention to provide a system for demodulating PSK modulated data which includes transitional cycles at the time of data state transitions.

It is a further object of this invention to provide such a system which provides its own reference signal in a manner which compensates for transitional cycles and loss of cycles in the transmission.

It is a further object of this invention to provide an improved demodulator for PSK modulated information.

It is a further object of this invention to provide such an improved system and demodulator applicable to stress wave telemetry and other acoustic vibration communication systems.

Other objects and advantages of the invention will be apparent to those of ordinary skill in the art having reference to this specification together with its drawings.

SUMMARY OF THE INVENTION

The invention may be incorporated into a data transmission system for the transmission of phase shift keyed (PSK) modulated information. At the demodulator end of the system, a reference signal is generated by rectifying the input signal, applying it to a phase-locked loop, and averaging the pulses by way of a divide-down counter followed by a frequency multiplier. The divide-down counter is preferably of a number greater than the expected number of transitional cycles; the frequency multiplier increases the frequency back to that of the input signal. The reference signal is applied to a synchronous demodulator amplifier which receives the input signal. Filtering and wave shaping may be applied to the output of the amplifier to place the demodulated data stream into useable form.

DETAILED DESCRIPTION OF THE PREFERRED EMBODIMENT

Figure 1:
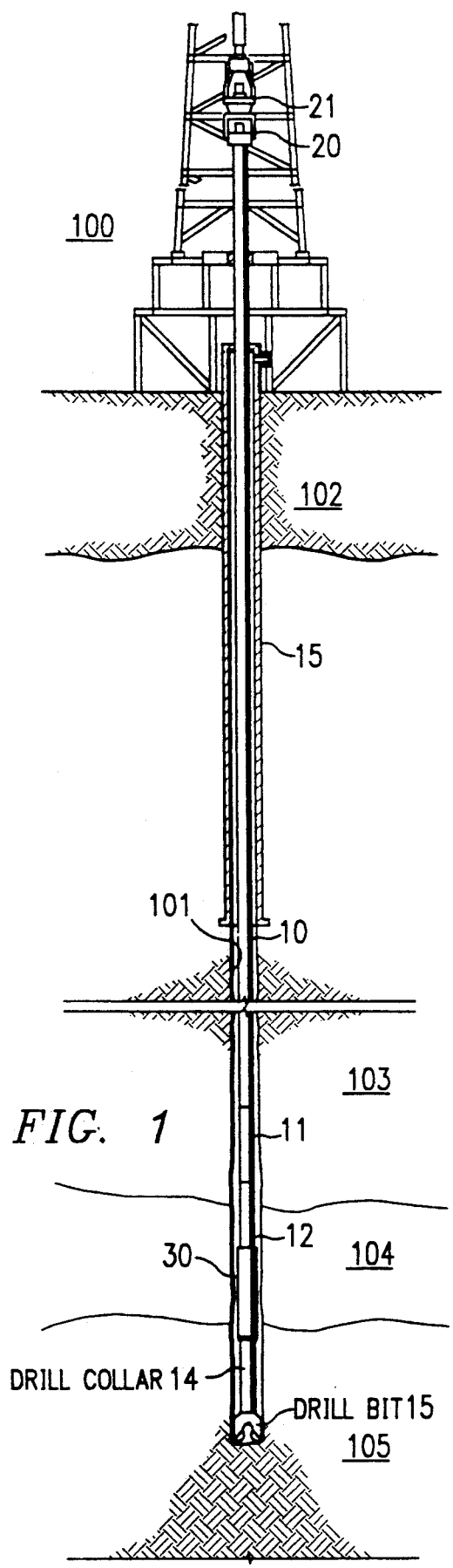
FIG. 1 illustrates a drilling operation in which the preferred embodiment of the invention is useful.

Referring now to FIG. 1, a drilling environment into which a system using the preferred embodiment of the invention is installed will now be described. It should be noted that the present invention is applicable to many uses of phase shift keyed (PSK) modulated data communication, and not solely to stress wave telemetry as will be described herein. As noted hereinabove, however, the present invention is particularly attractive for systems using drill pipe or similar media which present non-ideal frequency response to the signal (and thus favoring transmission at a single frequency), especially for systems using a medium which resists signal phase changes, causing transitional cycles of the modulated information.

FIG. 1 illustrates a conventional drilling rig 100. Drill string 10 consists of number of individual sections, or joints, connected to one another in the conventional manner. A swivel 21 is shown in FIG. 1 for providing the drilling force on drill string 10, so that drill bit 15, attached to the distal end of drill string 10 via drill collar 14, can penetrate the earth and advance the drilling operation into sub-surface layer 105, as it has through overlying layers 102, 103 and 104. Various subs 11 and 12 may also be provided, in the conventional manner.

Figure 2:
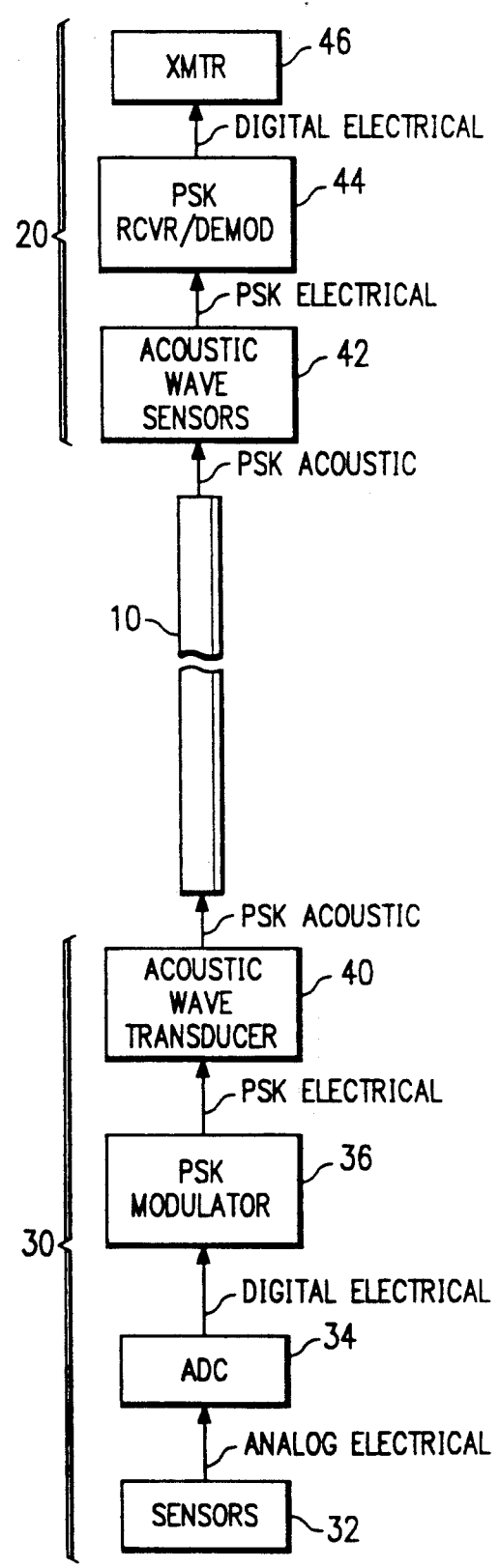
FIG. 2 is a system diagram, in block form, of a PSK modulated data transmission system as applied to stress wave telemetry.

Sub 30 is also provided in the drilling operation of FIG. 1, for sensing downhole information and sending the same to the surface. Referring to FIG. 2, a block diagram of a stress wave telemetry system incorporating the preferred embodiment of the invention will now be described. In sub 30, sensors 32 may be provided for sensing such parameters as pressure on the bit, temperature, gamma radiation, angle, mud pressure, and the like. Sensors 32 are conventional sensors, selected according to the desired information, such as data relating to the drilling operation. It should be noted that sensors 32 may alternatively be located outside of sub 30, with communication to sub 30 in the conventional manner. Sensors 32 provide analog electrical information to a conventional analog-to-digital converter 34 (ADC) in sub 30, for conversion of the analog information into digital electrical signals. Multiple ones of ADCs 34 may be provided, for converting multiple channels of information, or alternatively a multiplexing scheme may be utilized, so that multiple sensors 32 can provide a wide range of data for transmission to the surface.

Also located in sub 30 is PSK modulator 36. PSK modulator 36 includes a conventional modulator which converts the digital electrical signal provided by ADC 34 into a PSK modulated electrical signal. PSK modulator 36 in FIG. 2 may also include a microprocessor or other logic circuit for managing the transmission of information from multiple sensors 32, such as from multiple channels from multiple ADCs 34, if desired. As will be further described hereinbelow, the output of PSK modulator 36, as is conventional in 180° phase shift modulation, will shift the phase of its output by 180° in communicating a transition from a "0" to a "1" digital data state, and vice versa. It is preferred that such phase shifts occur at a zero crossing point of the signal, as is conventional in PSK modulation.

The PSK electrical signal output by PSK modulator 36 is provided to acoustic wave transducer 40, which generates an acoustic vibration in drill string 10 according to the PSK modulated electrical signal provided thereto by PSK modulator 36. The preferred types of acoustic wave transducer 40 are described in my copending U.S. Pat. applications Ser. Nos. 554,022 and 554,030, both filed Jul. 16, 1990, assigned to Atlantic Richfield Company and incorporated herein by this reference. Other transducers are described in copending application Ser. No. 183,231 filed Apr. 21, 1988, also assigned to Atlantic Richfield Company, and incorporated herein by this reference.

At the surface of the earth in this example, drilling rig 100 includes a sensor sub 20 which includes acoustic wave sensors 42 for sensing vibrations in drill string 10, particularly those imparted by acoustic wave transducer 40. Acoustic wave sensors 42 may be conventional strain gauges, accelerometers, and the like, arranged in sub 20 to be capable of sensing stresses and vibrations in drill string 10 and generating an analog electrical signal according thereto; in this example, this analog electrical signal is PSK modulated, since the acoustic waves received by sensors 42 are PSK modulated. Also in sub 20, PSK receiver/demodulator 44 is provided for receiving the PSK electrical signal from sensors 42 and for generating a digital electrical signal according thereto. The digital electrical signal generated by PSK receiver/demodulator 44 is communicated to a transmitter 46. Transmitter 46 may transmit the information by radio waves, or over a hardwire connection, to a computer (not shown) where the information transmitted from downhole sub 30 can be interpreted.

The systems of FIGS. 1 and 2 thus provide a way for communicating information from downhole in a drilling operation to a surface computer. As a result of the transmitted information about the drilling operation, and the formations 102, 103, 104 and 105 surrounding the borehole, adjustments in the drilling operation can be made in real-time, resulting in improved drilling accuracy, efficiency, and safety.

As noted hereinabove, drill string 10 in this system distorts acoustic vibrations transmitted therethrough. As described in my copending applications Ser. No. 554,022 and 554,030, certain frequencies of vibrations are attenuated by drill string 10, with the attenuated frequencies dependent on the length of the sections in drill string 10, as well as on the type of vibrations (compressional or torsional) being transmitted. The non-ideal and non-uniform frequency response of drill string 10 makes the use of FSK modulated transmission less attractive, sine the use of multiple frequencies increases the likelihood that transmission at a stopband frequency is being attempted. Since the physical characteristics of drill string 10 change during the drilling operation, even though the length of the individual sections remains constant (which is the largest factor in determining the stopband frequencies), the characteristics of drill string 10 still may change sufficiently that one of the multiple selected transmission frequencies becomes unduly attenuated by drill string 10. As a result, transmission at a single frequency is preferable where drill string 10 is the medium.

Figure 3A:
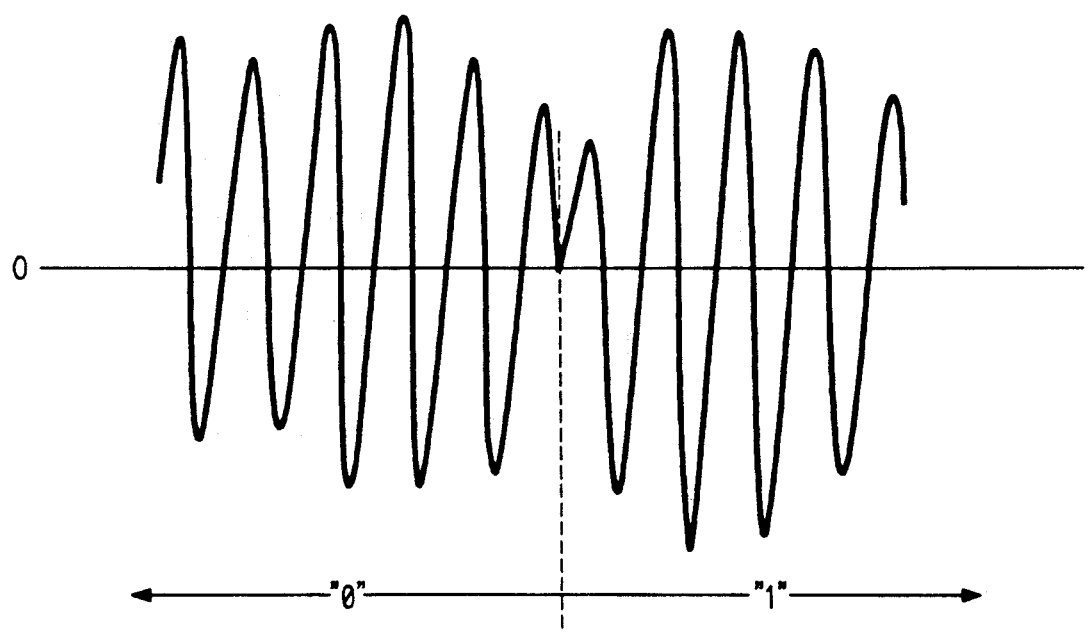
FIGS. 3a and 3b are an electrical diagram, in block form, of the receiver of the system of FIG. 2 according to the preferred embodiment of the invention.

As is well known, PSK modulation uses a single carrier frequency, indicating the transmitted digital data state by the instantaneous phase of the signal over the bit cell (i.e., the number of cycles f he carrier signal used to communicate a single bit). Referring to FIG. 3a, an ideal PSK signal is illustrated in making a change from a "0" state to a "1" state. It should be noted that a bit cell, i.e., the number of cycles of the carrier signal used in establishing a single bit, is preferably much larger than the portions shown in FIG. 3a. For example, stress wave telemetry using compressional vibrations may use a carrier signal of 920 Hz communicating data at 50 Hz; as a result, eighteen cycles of the 920 Hz carrier signal are used to communicate each data bit (i.e., the "bit cell" is eighteen cycles). As shown in FIG. 3a, an ideal transition changes phase in the amount of 180° at a zero crossing point, with the "1 " bit cell beginning immediately at the end of the "0" bit cell. Many media approach this ideal transition, particularly in hardwired and radio transmission.

Figure 3B:
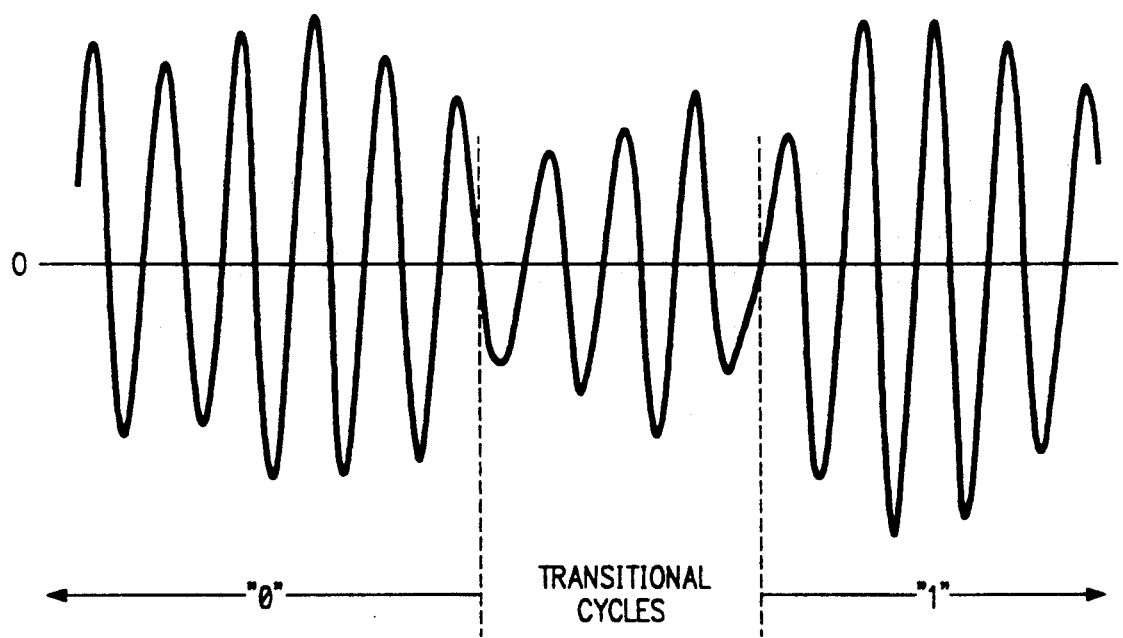

FIG. 3b is an illustration of a similar transition, as measured for the medium of a drill string having thirty-two sections of 3½ inch drill pipe, each section being thirty-one feet long, with the drill string suspended in a fluid-filled well. Rather than the instantaneous transition from a "0" to a "1" state as in the case of FIG. 3a, the impedance of the drill string to the transition causes a number of transitional cycles before the "1" state (i.e., 180° phase shift) is attained. As noted in FIG. 3b, the information is still present in the measured waveform; however, conventional demodulation circuitry misinterprets the transitional cycles, and is unusable to demodulate this information in real time.

Figure 4:
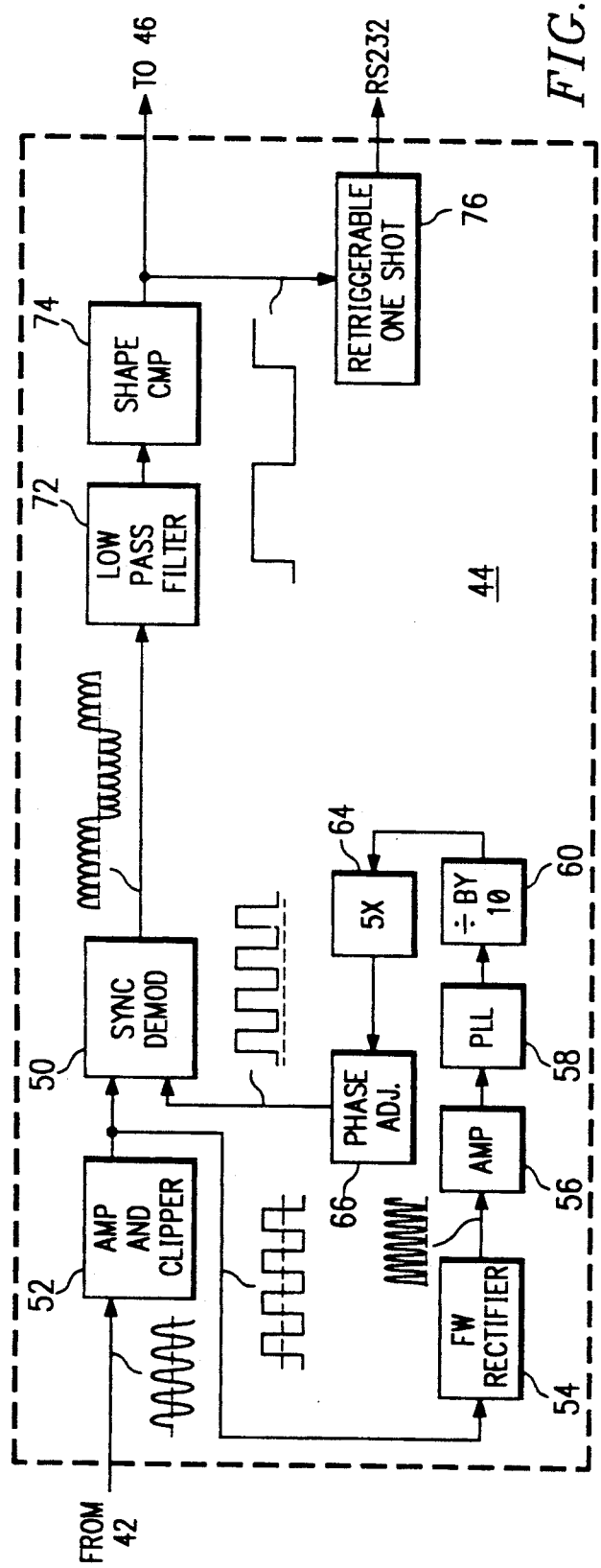
FIG. 4 is a timing diagram illustrating the state of various signals in the receiver of FIGS. 3a and 3b.

Referring now to FIG. 4, the construction and operation of PSK receiver/demodulator 44 according to the preferred embodiment of the invention will now be described in detail. Waveform shapes are schematically illustrated in FIG. 4, relative to particular locations in receiver/demodulator 44. Receiver/demodulator 44 is constructed to generate its reference signal in such a manner to include tolerance for the transitional cycles between data states illustrated in FIG. 3b. In addition, receiver/demodulator 44 according to this embodiment of the invention is tolerant of missing pulses of the carrier signal, as can occur in the noisy and hostile environment of the downhole to surface communication in a drilling operation.

Receiver/demodulator 44 receives the input PSK modulated electrical signal from sensors 42 at the input to amplifier/clipper 50. Amplifier/clipper 50 is a conventional amplifier circuit, for example including an operational amplifier, for converting the input sinusoidal signal into a square wave by amplifying the signal and limiting the output swing of the amplifier. The output of amplifier/clipper 50 is applied to the input of synchronous demodulator 50, and to a full wave rectifier 54. Synchronous demodulator 50, as will be described in further detail hereinbelow, performs the demodulation of the PSK square wave output of amplifier/clipper 52 according to a reference signal which is generated from, and synchronized in frequency with, the PSK square wave. The reference signal is also in phase with the PSK square wave for one of the data states, and is substantially 180° out of phase with the other data state.

The circuitry for generating this reference signal begins with a conventional full wave rectifier 54, which receives the PSK square wave from amplifier/clipper 52. An example of full wave rectifier 54 is a diode bridge of conventional configuration, for example using IN4148 diodes manufactured and sold by National Semiconductor. Full wave rectifier 54 presents at its output a signal having peaks at twice the frequency of the PSK square wave, as it generates a pulse for each half-cycle of the output of amplifier 52.

It should be noted that a reference signal for PSK demodulation could be generated by applying the output of full wave rectifier 54 to a divide-by-2 counter, as the divide-by-2 counter would present a square wave at half the frequency of its input (which would be the frequency of the PSK input, due to the operation of full wave rectifier 54). This type of demodulation could be used for PSK systems in which the transition phase change is abrupt, such as in hardwired or radio transmission. However, for media such as drill strings or pipe structures, the presence of transitional cycles, or missing cycles due to noise, would cause such a demodulation scheme to misinterpret the PSK data sequence. According to this embodiment of the invention, the circuitry for generating the reference signal is able to tolerate such spurious events.

As shown in FIG. 4, according to this embodiment of the invention, the output of full wave rectifier 54 is connected to the input of an amplifier 56, which amplifies and adjusts the peaks to the proper logic level inputs to the remainder of the circuit. The output of amplifier 56 is connected to the input of phase-locked loop (PLL) 58. PLL 58 is a conventional PLL, such as an XR-2213 manufactured and sold by Exar, and provides a periodic signal at its output which is locked in frequency and phase to the primary frequency and phase of the amplified double-frequency peaks applied to its input. In addition, PLL 58 provides a cycle at its output even if an input pulse is missing in the periodic sequence applied thereto, as is conventional for PLLs. As a result, the generation of the reference signal to synchronous demodulator 50 will be tolerant of the varying frequency of transitional cycles, and of missing individual cycles due to noise which may be present in the PSK signal from sensors 42.

The output of PLL 58 is applied to the input of divide-by-ten counter 60. A preferred example of a conventional divide-by-ten counter 60 is the decade counter manufactured and by National Semiconductor under the part number 74HC190. Divide-by-ten counter 60 thus presents at its output a square wave which is at a frequency one-tenth that of the output of PLL 58 (which is locked to the output of full wave rectifier 54), and thus which is at a frequency one-fifth that of the input PSK signal.

Divide-by-ten counter 60 and PLL 58 serve to average the frequency of the pulses at the output of full wave rectifier 54. Once phase-locked, which generally occurs after five or ten cycles, PLL 58 will resist changes in frequency and phase which occur over one or a few cycles at its input. Accordingly, the variations in frequency that occur responsive to transitional cycles in the PSK input signal will tend not to be reflected at the output of PLL 58. In addition, divide-by-ten counter 60 is also not responsive to the timing of individual cycles, but presents a signal at its output which is timing-sensitive only to the tenth cycle in sequence at its input. Accordingly, variation in instantaneous frequency caused by the transitional cycles of the PSK input signal will tend not to be reflected at the output of divide-by-ten counter 60. Divide-by-ten counter 60 thus provides tolerance for transitional cycles of PSK input signal applied to receiver/demodulator 40 by sensor 42.

It should be noted that the integer by which counter 60 divides the frequency of the output of full-wave rectifier 54, selected as ten in this example, is not particularly critical in the tolerance of the transitional cycles in generating the reference signal. However, the integer should be sufficiently larger than the number of transitional cycles expected, so that variations in instantaneous frequency experienced during the transitional cycles are averaged with the steady frequency cycles in the bit cells. In this example, where the number of transitional cycles is on the order of four, as shown in FIG. 3b, the integer value of ten will provide good tolerance.

In order to generate a reference signal for demodulation, however, the original frequency must be restored. In receiver/demodulator 40 according to this embodiment of the invention, the output of divide-by-ten counter 60 is applied to a frequency multiplier 64. Frequency multiplier 64 may be formed as a conventional frequency synthesizer, for example a PLL such as the XR-2213 noted hereinabove, with a counter, such as the 75HC190 noted hereinabove, connected in the feedback loop of the PLL between the output of the voltage controlled oscillator and the input of the phase detector, as in the conventional frequency synthesizer configuration. In this example, since the output of divide-by-ten counter 60 is one-fifth the frequency of the input PSK signal, frequency multiplier 64 presents, at its output, a signal at a frequency five times the frequency applied to its input. This may be accomplished by configuring the counter in the feedback loop of the PLL to count by five.

It should be noted that the circuitry for generating the reference signal incorporates some finite delay, or phase shift, at the output of frequency multiplier 64 relative to the PSK square wave at the output of amplifier/clipper 52. In order to compensate for the phase difference, phase adjustment circuit 66 is provided, for delaying the output of frequency multiplier 64 a sufficient amount so that the output of phase adjustment circuit 66 is either in phase with, or 180° out of phase with (depending on the data state), the PSK signal at the output of amplifier/clipper 52. An example of a phase adjustment circuit 66 is a retriggerable single shot such as the 74HC123 manufactured and sold by National Semiconductor, together with a potentiometer controlling the timing between the input signal thereto and the output signal therefrom. Since the number of carrier cycles per bit cell remains constant over the transmitted data sequence, adjusting the delay through phase adjustment circuit 66 allows the reference signal at the carrier frequency to synchronize with the carrier frequency of the PSK input data.

Figure 5:
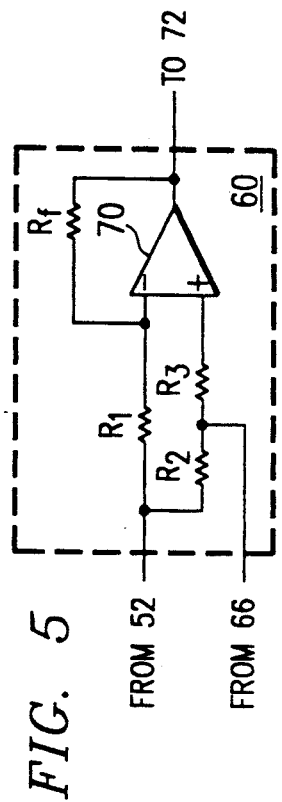
FIG. 5 is an electrical diagram, in schematic form, of the synchronous demodulator in the receiver of FIGS. 3a and 3b according to the preferred embodiment of the invention.

The output of phase adjustment circuit 66 is applied to synchronous demodulator 50, as is the PSK square wave signal from the output of amplifier/clipper 52. Referring now to FIG. 5, the construction and operation of synchronous demodulator 50 will now be described. The construction and theory of operation of synchronous demodulator 50 is described in Lancaster, "Hardware Hacker", *Radio Electronics* (Mar. 1990), pp. 78 et seq., incorporated herein by this reference. Synchronous demodulator 50 includes a conventional operational amplifier 70. The output of amplifier/clipper 52 is connected to the inverting input of op amp 70 through resistor $R_1$, for communication of the PSK input square wave thereto. The output of phase adjustment circuit 66, communicating the reference signal, is coupled to the non-inverting input of op amp 70 via a voltage divider consisting of resistors $R_2$ and $R_3$; resistor $R_2$ is connected between the output of phase adjustment circuit 66 and the output of amplifier/clipper 52, and resistor $R_3$ is connected between the output of phase adjustment circuit 66 and the non-inverting input of op amp 70. A feedback resistor $R_f$ is connected between the output of op amp 70 and its inverting input, in the conventional manner.

The values of resistors $R_1$ through $R_3$ are selected to provide the desired gain of op amp 70 to the signals provided from the output of amplifier/clipper 52 and the output of phase adjustment circuit 66. In the preferred embodiment of the invention, the values of resistors $R_2$ and $R_3$ are equal to one another, for example on the order of 5 kOhms. Also in this embodiment, the preferred values of resistors $R_1$ and $R_f$ are twice that of the values of resistors $R_2$ and $R_3$, and in this example are on the order of 10 kOhms. This construction of synchronous demodulator 50 will generate, at its output, a full wave rectified series of pulses of positive polarity when the signals applied to its inputs are in phase with one another, and a full wave rectified series of pulses of negative polarity when the signals applied thereto are out of phase (i.e., 180° out of phase), as discussed in the Lancaster article noted hereinabove.

The output of synchronous demodulator 50 is coupled through a conventional low pass filter 72, which removes the high frequency portion of the full wave rectified signal from synchronous demodulator 50. At the output of low pass filter 72, a digital signal is thus generated which has a logic level corresponding to whether the input PSK signal was in phase, or 180° out of phase, with the reference signal generated at the output of phase adjustment circuit 66. This digital signal is communicated to wave shaping circuit 74, which presents the PSK modulating data with the desired signal shape and logic levels. For a square wave serial digital output, a preferred example of wave shaping circuit 74 is a Schmitt trigger, manufactured and sold by National Semiconductor under the part number 74HCT14. Thus a serial digital data stream is presented at the output of wave shaping circuit 74, for communication to transmitter 46, and to a computer for analysis of the transmitted data.

Other formats for the communication of data from receiver/demodulator 40 may also be used. For example, as shown in FIG. 4, a retriggerable one-shot, such as the 74HCT123 noted hereinabove, controlled by conventional timing components according to the desired baud rate, can receive the output of wave shaping circuit 74 and place the same in RS-232 compatible format. Further in the alternative, a serial-in parallel-out register may receive the serial digital data stream from wave shaping circuit 74, for presentation of a digital word in parallel in the conventional manner.

Accordingly, in operation, receiver/demodulator 40 demodulates the PSK data transmitted to its input in such a manner that transitional cycles between data states, such as shown in FIG. 3b, do not affect the synchronization and data analysis of the remaining, unaffected, bits in each bit cell. This is due to the averaging performed by, in this example, divide-by-ten counter 60 together with frequency multiplier 64, generating a reference signal at substantially the frequency of the PSK input signal; variations in the signal frequency such as occur at data state changes for media such as drill string 10 therefore do not strongly affect the generation of the reference signal in this embodiment of the invention. PLL 58 further assists the averaging process, by generating a pulse even where a pulse is absent as a result of system noise; furthermore, since PLL 58 resists phase change in the input signal from being rapidly repeated at its output, phase consistency of the reference signal is maintained during the transitional cycles.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A phase shift keyed demodulator circuit, comprising:
    a demodulator having a first input for receiving an input signal and a second input for receiving a reference signal, for presenting a signal at its output corresponding to the phase difference between the signals received at its input;
    a reference signal generating circuit, having an input receiving said input signal, and having its output coupled to said second input of said demodulator, comprising:
        a frequency divider circuit having an input coupled to said input of said generating circuit, for generating at its output a periodic signal at a period which is an integral multiple of the period of said input signal; and
        a frequency multiplier, having an input coupled to the output of said frequency divider, having an output coupled to said second input of said demodulator, for generating at its output a periodic signal at a frequency which is an integral multiple of the frequency of the signal at the output of said frequency divider.

2. The circuit of claim 1, wherein the generating circuit further comprises:
    a rectifying circuit, having an input coupled to receive said input signal and having an output coupled to said input of said frequency divider so that the pulses received by said frequency divider are full wave rectified from said input signal.

3. The circuit of claim 1, wherein said reference signal generating circuit further comprises:
    a phase locked-loop coupled between said input of said generating circuit and the input of said frequency divider.

4. The circuit of claim 3, wherein said reference signal generating circuit further comprises:
    a phase adjustment circuit coupled between said output of said frequency multiplier and the second input of said demodulator.

5. The circuit of claim 1, wherein said demodulator comprises:
    a differential amplifier, having a first input for receiving said input signal, and having a second input; and
    a resistor network coupled to said second input of said differential amplifier, said resistor network coupled to receive said input signal and the output of said generating circuit in such a manner that the differential voltage at said first and second inputs of said differential amplifier is indicative of the phase relationship between said input signal and the output of said generating circuit.

6. The circuit of claim 5, wherein said resistor network comprises a voltage divider, having a first end receiving said input signal, having a second end coupled to said second input of said differential amplifier, and having an intermediate node for receiving the output of said generating circuit.

7. A method of demodulating a phase shift keyed signal, comprising:
    receiving a periodic input signal;
    generating a frequency divided signal from said input signal, said frequency divided signal having a period which is an integral multiple of said input signal;
    generating a frquency multiplied signal from said frequency divided signal, said frquency multiplied signal having a frequency which is an integral multiple of said frequency divided signal; and
    applying said input signal and said frquency multiplied signal to a demodulator to generate an output indicative of the relative phase between said input signal and said frequency multiplied signal.

8. The method of claim 7, further comprising:
    transmitting a phase shift keyed signal along a medium; and
    receiving said phase shift keyed signal at a destination location of said medium;
    wherein said periodic input signal is generated from said received phase shift keyed signal.

9. The method of claim 8, wherein said medium distorts said phase shift keyed signal in such a manner that said receiving step receives a plurality of transitional cycles are received in said receiving step responsive to said transmitting step transmitting a change in phase of said phase shift keyed signal.

10. The method of claim 9, wherein the integral multiple of said step of generating a frequency divided signal is larger than the number of said plurality of transitional cycles.

11. The method of claim 7, further comprising:
    rectifying said phase shift keyed signal prior to said step of generating a frquency divided signal, such that the frequency divided signal is generated from said rectified phase shift keyed signal.

12. The method of claim 7, further comprising:
    generating a phase locked signal from said input signal;
    wherein said step of generating a frequency divided signal generates said frequency divided signal from said phase locked signal.

13. The method of claim 12, further comprising:
    filtering the output of said demodulator in such a manner as to result in a digital signal substantially at the frequency of the phase shift keying of the input signal.

14. A telemetry system, comprising:

a transmitter for transmitting a phase shift keyed signal into a location of a medium;

a receiver for receiving said phase shift keyed signal at a location of said medium remote from said location of said transmitter; and a demodulator circuit, comprising:

a demodulator having a first input for receiving the received phase shift keyed signal and a second input for receiving a reference signal, for presenting a signal at its output corresponding to the phase difference between the signals received at its input;

a frequency divider circuit having an input receiving the received phase shift keyed signal, said frequency divider circuit for generating at its output a periodic signal at a period which is an integral multiple of the period of the received phase shift keyed signal; and a frequency multiplier, having an input coupled to the output of said frequency divider, having an output coupled to said second input of said demodulator, for generating at its output a periodic signal at a frequency which is an integral multiple of the frequency of the signal at the output of said frequency divider.

15. The system of claim 14, wherein said medium has a response to said phase shift keyed signal such that a plurality of transitional cycles are received responsive to a change in phase of said transmitted phase shift keyed signal.

16. The system of claim 14, wherein said transmitter transmits said phase shift keyed signal by vibrating the medium.

17. The system of claim 14, wherein said demodulator circuit further comprises:

a phase locked-loop having an input receiving said received phase shift keyed signal and having an output coupled to the input of said frequency divider.

18. The system of claim 17, wherein said demodulator circuit further comprises:

a low pass filter coupled to the output of said demodulator.

19. The system of claim 14, wherein said demodulator circuit further comprises:

a clipping circuit, for receiving said received phase shift keyed signal and for presenting to said demodulator and to said frequency divider a square wave signal corresponding to said received phase shift keyed signal.

20. The system of claim 14, wherein said demodulator circuit further comprises:

a phase adjustment circuit having an input coupled to the output of said frequency multiplier and having an output coupled to said second input of said demodulator, for adjusting the phase of the output of said frequency multiplier to account for propagation delay.

* * * * *